US012661594B2

(12) United States Patent
O'Dowd et al.

(10) Patent No.: US 12,661,594 B2
(45) Date of Patent: Jun. 23, 2026

(54) HOLDER FOR ATTACHING A VIRTUAL REALITY DEVICE CONTROLLER TO AN IMPLEMENT

(71) Applicant: WIN Reality, LLC, Austin, TX (US)

(72) Inventors: Christopher Kelley O'Dowd, Austin, TX (US); Jesse Allen Easdon, Austin, TX (US)

(73) Assignee: WIN Reality, LLC, Austin, TX (US)

( * ) Notice: Subject to any disclaimer, the term of this patent is extended or adjusted under 35 U.S.C. 154(b) by 485 days.

(21) Appl. No.: 18/185,316

(22) Filed: Mar. 16, 2023

(65) Prior Publication Data

US 2023/0294004 A1 Sep. 21, 2023

Related U.S. Application Data

(60) Provisional application No. 63/320,219, filed on Mar. 16, 2022.

(51) Int. Cl.
*A63F 13/98* (2014.01)
(52) U.S. Cl.
CPC ...... *A63F 13/98* (2014.09); *A63F 2300/8082* (2013.01)
(58) Field of Classification Search
CPC ........ A63F 13/24; A63F 13/245; A63F 13/98; A63F 13/211; A63F 13/812; A63F 2300/8082
See application file for complete search history.

(56) References Cited

U.S. PATENT DOCUMENTS

| | | | | |
|---|---|---|---|---|
| 3,878,849 A | * | 4/1975 | Muller | A61M 25/02 |
| | | | | 604/179 |
| 8,083,589 B1 | * | 12/2011 | Kavars | A63F 13/428 |
| | | | | 73/489 |
| 8,550,915 B2 | * | 10/2013 | Ashida | A63F 13/98 |
| | | | | 345/161 |
| 8,568,233 B2 | * | 10/2013 | Block | A63F 13/98 |
| | | | | 463/47 |
| 10,328,339 B2 | * | 6/2019 | May | A63F 13/211 |
| 11,213,733 B1 | * | 1/2022 | Morin | A63F 13/428 |

(Continued)

FOREIGN PATENT DOCUMENTS

| | | | | | |
|---|---|---|---|---|---|
| CN | 102574016 A | * | 7/2012 | ............. | A63F 13/98 |
| WO | WO-2021220184 A1 | * | 11/2021 | ............. | A63F 13/98 |

OTHER PUBLICATIONS

"How to attach Quest 2 Controller on Real Bat—IB Cricket VR", published Aug. 2, 2021. Source: https://www.youtube.com/watch?v=mVcK2TwWA20 (Year: 2021).*

*Primary Examiner* — Steven J Hylinski
(74) *Attorney, Agent, or Firm* — Sprinkle IP Law Group

(57) ABSTRACT

A virtual reality controller holder is provided. The virtual reality controller holder comprises a resilient base that is adapted to releasably fasten to a handheld implement, the resilient base having an inner side that faces the handheld implement during use and an outer side opposite the inner side. The virtual reality controller holder further comprises a resilient sleeve disposed on the outer side of the base, the resilient sleeve adapted to receive and expand around a handle of a virtual reality controller. Embodiments of the virtual reality controller holder further comprise a retaining strap to secure the controller to the holder.

20 Claims, 12 Drawing Sheets

(56)          References Cited

U.S. PATENT DOCUMENTS

| | | | | |
|---|---|---|---|---|
| 2007/0265075 A1* | 11/2007 | Zalewski | ................ | A63F 13/24 |
| | | | | 463/36 |
| 2009/0038721 A1* | 2/2009 | Wakitani | ................ | A63F 13/24 |
| | | | | 150/154 |
| 2009/0149255 A1* | 6/2009 | Fu | ........................... | A63F 13/98 |
| | | | | 463/36 |
| 2011/0190056 A1* | 8/2011 | Xu | ........................... | G06F 3/02 |
| | | | | 345/169 |
| 2011/0244962 A1* | 10/2011 | Kidakarn | ............. | A63F 13/245 |
| | | | | 463/36 |
| 2011/0306424 A1* | 12/2011 | Kazama | ................. | A63F 13/98 |
| | | | | 463/37 |
| 2014/0200085 A1* | 7/2014 | Bares | ..................... | A63F 13/98 |
| | | | | 463/47 |
| 2018/0196523 A1* | 7/2018 | Arana | ................... | A63F 13/212 |
| 2021/0077912 A1* | 3/2021 | Armand | ................. | A63F 13/98 |

* cited by examiner

HOLDER FOR ATTACHING A VIRTUAL REALITY DEVICE CONTROLLER TO AN IMPLEMENT

RELATED APPLICATIONS

This application claims the benefit of priority under 35 U.S.C. § 119(e) to U.S. Provisional Patent Application No. 63/320,219, entitled "Holder for Attaching a Virtual Reality Device Controller to an Athletic Implement," filed Mar. 16, 2022, which is hereby fully incorporated by reference herein in its entirety.

TECHNICAL FIELD

The present disclosure generally relates to holders for attaching virtual reality device controllers to implements, such as handheld implements. Even more particularly, some embodiments relate to holders for attaching virtual reality device controllers to athletic implements. Some embodiments also relate to sports training devices, and more specifically to systems and methodologies that leverage motion analytics and metrics to improve the performance of athletes.

BACKGROUND

The way an athlete swings a club, bat, stick or other handheld implement may be crucial to their success on the field. Successful athletes not only have good fundamental mechanics but are also able to adapt those mechanics to the dynamics of on-the-field play. For example, a successful baseball batter must not only have good underlying batting mechanics but must also be able to adapt those mechanics to a variety of different pitchers and pitches that the player may encounter during the season. Typically, athletes honed their mechanics by working closely with trainers and by gaining experience with a variety of scenarios on the field.

In some cases, baseball and softball trainers employ swing analysis and development tools. While swing analysis and development tools can apply motion analytics to generate data and swing analyses, they must be used in conjunction with a live pitcher. The use of these tools is thus limited to situations in which a live pitcher is available. Such swing analysis and development tools do not provide a means by which a player can practice against pitchers that the player has not yet encountered.

The advent of virtual reality has made additional tools available for training athletes that address some of the shortcomings of prior tools. For example, commonly assigned U.S. Pat. No. 10,821,347 (Reilly et al.) discloses virtual and augmented reality sports training environments that may be utilized for training baseball players and other athletes. These environments are created using a heads-up display that creates a virtual environment for the user to practice batting against virtual pitchers constructed from live footage of various real-life pitchers. However, the system was geared towards evaluating the decision making of the batter and did not provide swing analytics.

Other tools typically consist of a specialized sensor that attaches to the end of the bat proximal to the hand grip (i.e., specialized sensors that attach to the knob end of the bat), and a related software application that applies motion analytics to the data collected from the sensor. Some VR sports training systems include a specialized practice implement (golf club or bat) specifically designed for a VR controller.

Such systems do not allow an athlete to practice with real world equipment (e.g., regulation baseball bats, golf clubs, etc.).

SUMMARY

Embodiments of the present disclosure provide holders for securely holding virtual reality device controllers on handheld implements. Even more particularly, some embodiments provide holders for securely holding virtual reality device controllers on athletic implements, such as baseball bats, golf clubs, cricket bats, kayak paddles or other pieces of athletic equipment.

In one aspect, a virtual reality controller holder is provided. The virtual reality controller holder comprises a resilient base that releasably fastens to a handheld implement, the resilient base having an inner side that faces the handheld implement during use and an outer side opposite the inner side. The virtual reality controller holder further comprises a resilient sleeve disposed on the outer side of the resilient base, the resilient sleeve adapted to receive and expand around a handle of a virtual reality controller. The virtual reality controller holder further comprises a retaining strap to secure the virtual reality controller to the virtual reality controller holder.

Another aspect may include a method that uses the virtual reality controller holder. According to one embodiment, a method of using a virtual reality controller holder comprises attaching the virtual reality controller holder to a handheld implement. The method can include inserting the grip of the virtual reality controller into the resilient sleeve, securing the virtual reality controller to the virtual reality controller holder using the retaining strap, displaying on a display of the virtual reality system a virtual moving object, acquiring movement data by tracking the movement of the handheld implement along a trajectory and using the movement data to train a user in the user of the handheld implement.

In another aspect, a method is provided for training a user in a sport involving a handheld implement. The method comprises providing the user with a virtual reality headset equipped with a display; releasably attaching a holder to the handheld implement; disposing a controller for the headset in the holder; displaying, on the display, at least one moving object which requires the user to respond by moving the implement along a trajectory; acquiring movement data by tracking the movement of the implement along the trajectory; and using the movement data to train the user in the use of the implement.

In another aspect, a sports training tool is provided. The tool comprises a virtual reality headset; a controller for said headset; a holder which releasably fastens said controller to a substrate, such as a handheld implement.

In a further aspect, and in combination with a handheld sports implement, a training set is provided which comprises a virtual reality headset; a controller for said headset; and a holder which releasably fastens said controller to said handheld sports implement.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION

Figure 1:
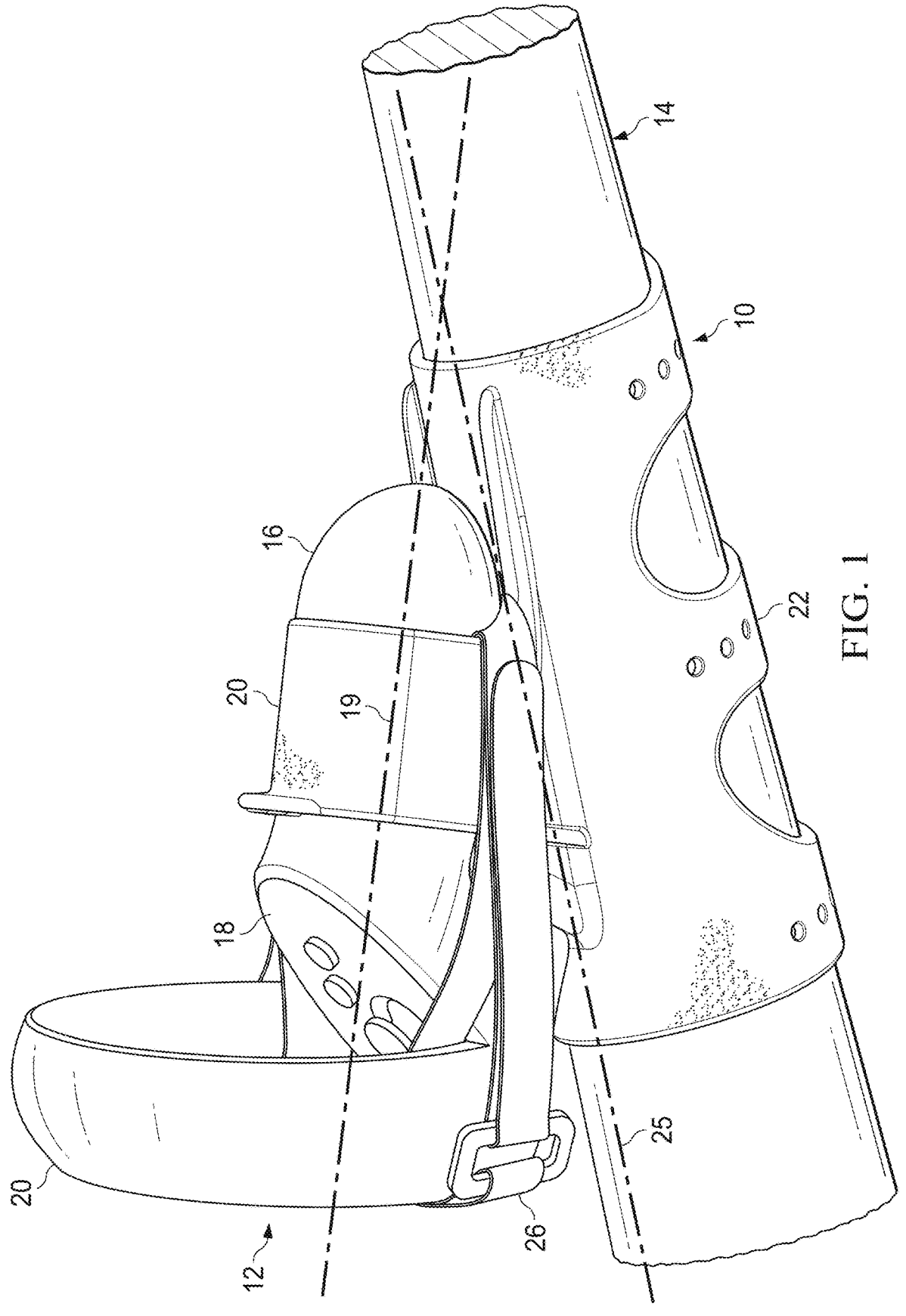
FIG. 1 illustrates one embodiment of a holder for securely and releasably attaching a VR controller to an implement.

It is to be understood that the present disclosure may assume various alternative orientations and step sequences, except where expressly specified to the contrary. It is also understood that the specific devices and processes illustrated in the attached drawings, and described in the specification are simply exemplary embodiments of the inventive concept disclosed and defined herein. Hence, specific dimensions, directions or other physical characteristics relating to the various embodiments disclosed are not to be considered as limiting, unless expressly stated otherwise.

VR systems comprise tracking devices that are used to track a user's movements in a physical space. The VR system translates the positions and orientations of the tracking devices from the physical space to a virtual space. Many VR systems include, for example, hand trackers for tracking the position and orientation of the user's hands to give the user hand presence in the virtual space.

In some implementations, a tracking device includes emitters that emit electromagnetic radiation to which sensors of the VR system are responsive. For example, a tracking device may include infrared (IR) light emitting diodes (LEDs) that emit IR light to which cameras of the VR system are responsive. In other implementations, the tracking devices include sensors that are responsive to electromagnetic radiation emitted by other portions of the VR system. For example, the VR system may be a system that paints pulsed IR light towards a tracking device, with the plurality of tracking sensors of the tracking device being IR light sensors that may receive or be shadowed from the broadcast pulsed IR light. In some implementations, the cameras or other devices that are responsive to the electromagnetic radiation emitted by a tracking device or the emitters that emit electromagnetic radiation to which the sensor of the device is responsive are mounted to a VR headset. The tracking devices or other parts of a VR system may also include sensors, such as gyroscopic sensors, accelerometers, or other sensors to aid in tracking.

Often, the tracking devices are part of a handheld controller that includes various hand operated controls, such as but are not limited to, buttons, knobs, wheels, control sticks, trackballs, and directional pads. While the form factor may vary between systems, the handheld controllers for VR systems typically include a handle or grip extending in a longitudinal direction. The grip is shaped and dimensioned to be grasped by a user's hand. For example, the grip may generally have a curved outer profile (e.g., circular, oval-shaped, or curved outer profile of constant or varying cross-section) that is comfortable to hold. A handheld controller may further include a head section disposed at the end of the controller grip. In some cases, the head of the handheld controller includes controls, such as thumb-operated controls (that is, controls that may be conveniently manipulated by the user's thumb during normal operation). The controller grip may also include triggers, buttons, or other controls that are conveniently manipulated by the user's fingers.

The handheld controllers of a VR system may integrate tracking devices. Typically, the tracking emitters or sensors are disposed in a tracking portion of the controller attached to the grip. The tracking portion may have a curved outer. In some controllers, the tracking emitters or tracking sensors are disposed in the head portion of the controller. Other controllers have a tracking ring in which the tracking sensors or tracking emitters are disposed. One example of a handheld controller using an LED tracking ring is described in U.S. Pat. No. 10,537,795, entitled "Hand-Held Controller Using LED Tracking Ring," filed Apr. 26, 2017.

The present disclosure provides holders for securely holding tracking devices on handheld implements, such as baseball bats, golf clubs, hockey sticks, sticks used in martial arts practice, or other handheld implements. Even more particularly, some embodiments are adapted to securely hold a VR hand controller on a handheld implement. As such, handheld controllers of commercially available VR systems can be used to track handheld implements in the physical environment.

According to one aspect of the present disclosure, embodiments can be used to secure a hand controller of a VR headset to facilitate athletic training. For example, some embodiments can allow a VR controller to be positioned on a baseball bat—e.g., on the shaft above the handle—and maintain the controller in this position as the bat is swung. As such, a controller for a VR headset (or other VR system) can be used for the purpose of providing swing analytics and feedback on player decision making.

FIG. 1 illustrates one embodiment of holder 10 for securely and releasably attaching a VR controller 12 to an implement 14, such as a baseball bat. While implement 14 is tapered in FIG. 1, holder 10 may be securely and releasably attached to implements with tapered shafts and shafts having non-circular cross sections.

VR controller 12 includes a hand grip 16 extending from a head 18 in a longitudinal direction (illustrated by longitudinal axis 19). Grip 16 is shaped and dimensioned to be grasped by a user's hand. Head 18 includes various thumb controls. Controller further includes a tracking ring 20 attached to grip 16 with tracking sensors or tracking emitters disposed therein.

Holder 10 comprises a holder base 22 that is adapted to be releasably secured around the outer profile of implement 14. Holder 10 includes an attachment mechanism that allows a user to attach base 22 to an underlying implement, such as implement 14. In the illustrated embodiment, for example, holder 10 includes a plurality of resilient and flexible fingers or straps extending out from a first lateral side of base 22. Holder 10 further comprises a controller receiver for holding controller 12. For example, holder 10 includes sleeve 24 that is adapted to receive grip 16 controller 12. Base 22, the securing straps, and sleeve 24 may be formed of any suitable material, including combinations of materials. According to one embodiment, base 22, the securing straps, and sleeve 24 are formed of or comprise a resilient, elastomeric material. In an even more particular embodiment, base 22, the securing straps, and sleeve 24 are formed of or comprise a polymeric material, such as a silicone rubber or a nitrile rubber. In one embodiment, base 22, the securing straps, and sleeve 24 are molded or otherwise formed as a single piece. In an even more particular embodiment, base 22, the securing straps, and sleeve 24 are formed of silicone having a durometer of 60A.

Holder 10 includes a fastening mechanism that allows the straps to be securely fastened around implement 14. Examples of fastening mechanisms include, but are not limited to buckles, buttons, or retaining nubs. One example of a fastening mechanism is illustrated in the embodiment of FIG. 2-FIG. 8. The user secures the straps around implement 14 in a sufficiently stretched state to cause base 22 to conform to or otherwise press against the outer contour of implement 14 with the implement facing surface of base 22 frictionally gripping or otherwise engaging the outer surface of implement 14. As such, holder 10 can tightly grip implement 14 so that holder 10 does not move when the user swings implement 14. The attachment mechanism can be adjustable to allow the user to attach holder 10 to a variety of implements such as, but not limited to, baseball bats, cricket bats, golf clubs, hockey sticks or kayak paddles.

Holder 10 further comprises a sleeve 24 or other structure, coupled to the outer side of base 22, for holding VR controller 12. More particularly, sleeve 24 defines an interior space that provides a controller receiving area to receive grip 16 of controller 12. While the outer portion of sleeve 24 is illustrated as a continuous band of material, sleeve 24 may include cutouts or openings or be include multiple spaced bands of material. In some embodiments, the holder may include releasable straps or other holding mechanism to hold grip 16.

The outer profile of the sleeve's controller receiving area when sleeve 24 is empty is, in some embodiments, smaller than the outer profile of grip 16 of VR controller 12. When the controller's grip 16 is inserted into the controller receiving area, sleeve 24 stretches or expands around the controller handle, causing the interior surface of sleeve 24 to frictionally engage the outer surface of the grip 16. As such, sleeve 24 can tightly grip the handle of VR controller 12. The interior surface of sleeve 24 may be surface finished to enhance the frictional engagement.

In some embodiments, the sleeve is oriented such that the longitudinal axis of the controller receiving area of the sleeve is parallel to the longitudinal axis of the base of the holder and, as such, will be parallel to the outer surface of the implement where the older is attached (assuming a straight outer surface) or the longitudinal axis of the implement if the implement is a cylinder. In other embodiments, such as illustrated in FIG. 1, the sleeve is configured so that the longitudinal axis of the controller receiving area of sleeve 24 is angled relative to the longitudinal axis 25 of base 22 and hence the outer surface of the implement (grip 16 and sleeve 24 are coaxial in the embodiment of FIG. 1).

Some materials, such as silicone, negatively affect IR light tracking. Angling the controller helps position the sensors/emitters of tracking ring 20 (or other portion of a controller) away from the base 102, thereby reducing potential interference of IR tracking by the material of holder 10 or the material of implement 14. Moreover, positioning the sensors/emitters further away from the implement can, in some cases, enhance tracking. When used with a baseball bat held in the correct angular orientation relative to the bat's longitudinal axis, for example, the emitters/sensors of tracking ring 20 to come into view of the sensors/emitters of a VR headset earlier in a swing than if the sensors/emitters were closer to the bat. In one embodiment, the base wall of sleeve 24 (the wall proximate to implement 14) is tilted from a first end to a second end to support grip 16 in an angled position.

In addition to or in the alternative to using friction to hold VR controller 12 in sleeve 24, holder 10 may further comprise retaining features that secure controller 12 to holder 10. In the embodiment illustrated a retaining strap 26 is looped around portions of tracking ring 20 and through sleeve 24 to hold VR controller 12 in sleeve 24. Preferably the straps or other retaining mechanisms positioned so as not block the tracking sensors/emitters of the VR controller. Alternatively, or in addition, the retaining straps or other retaining mechanisms may be formed of or comprise an IR transparent material (a material that is sufficiently IR transparent to allow tracking) or otherwise formed of a material that does that interfere with IR tracking or other tacking performed by the VR system. For example, a retaining strap 26 formed of a high IR transparency polymer or natural fiber will let sufficient IR radiation through to allow tracking of the IR sensors/emitters of tracking ring 20 even if the straps slip over the IR sensors/emitters.

Figure 2:
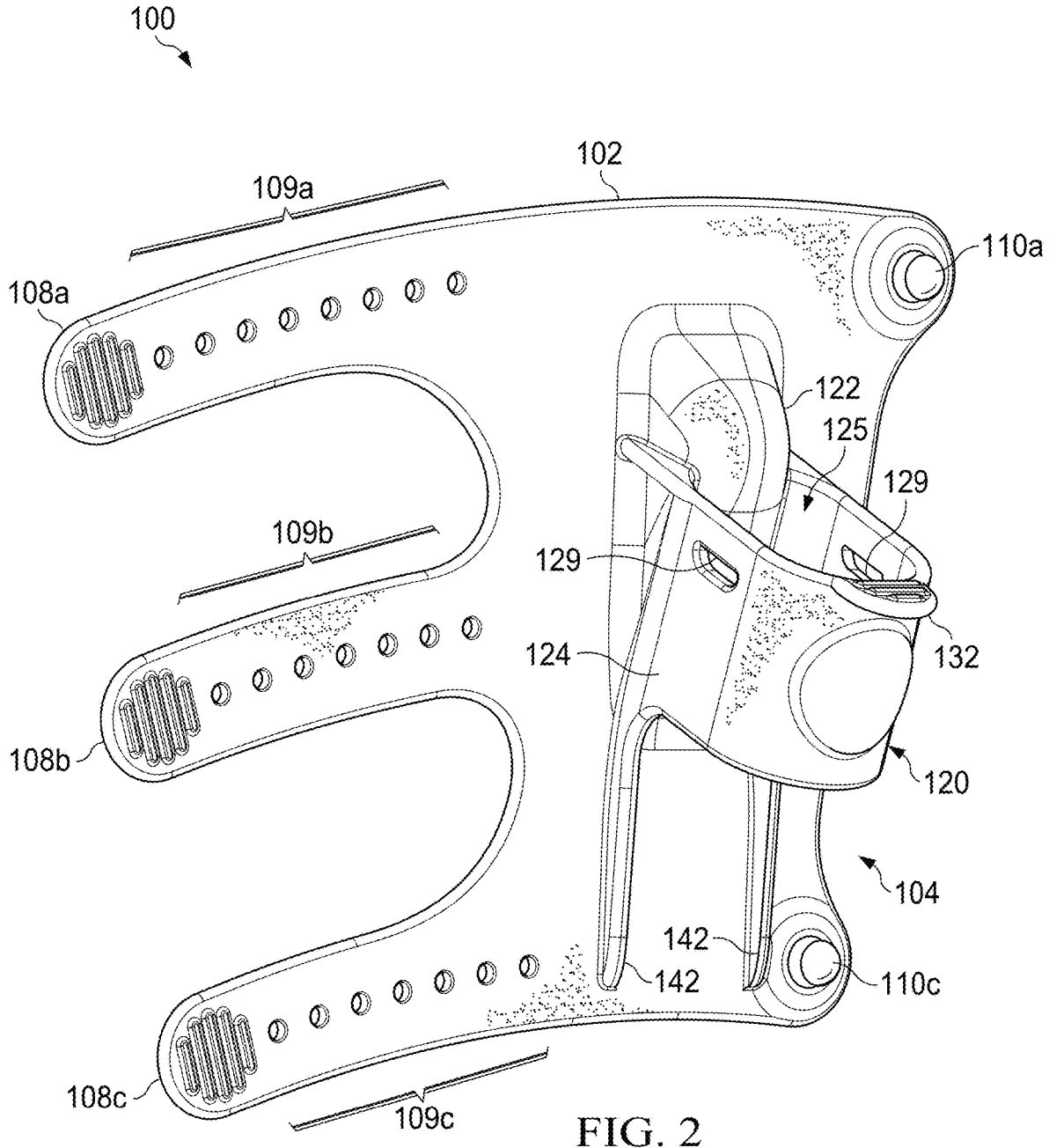
FIG. 2 is a diagrammatic representation of a first view of another embodiment of a holder for holding a virtual reality controller on an implement.
Figure 3:
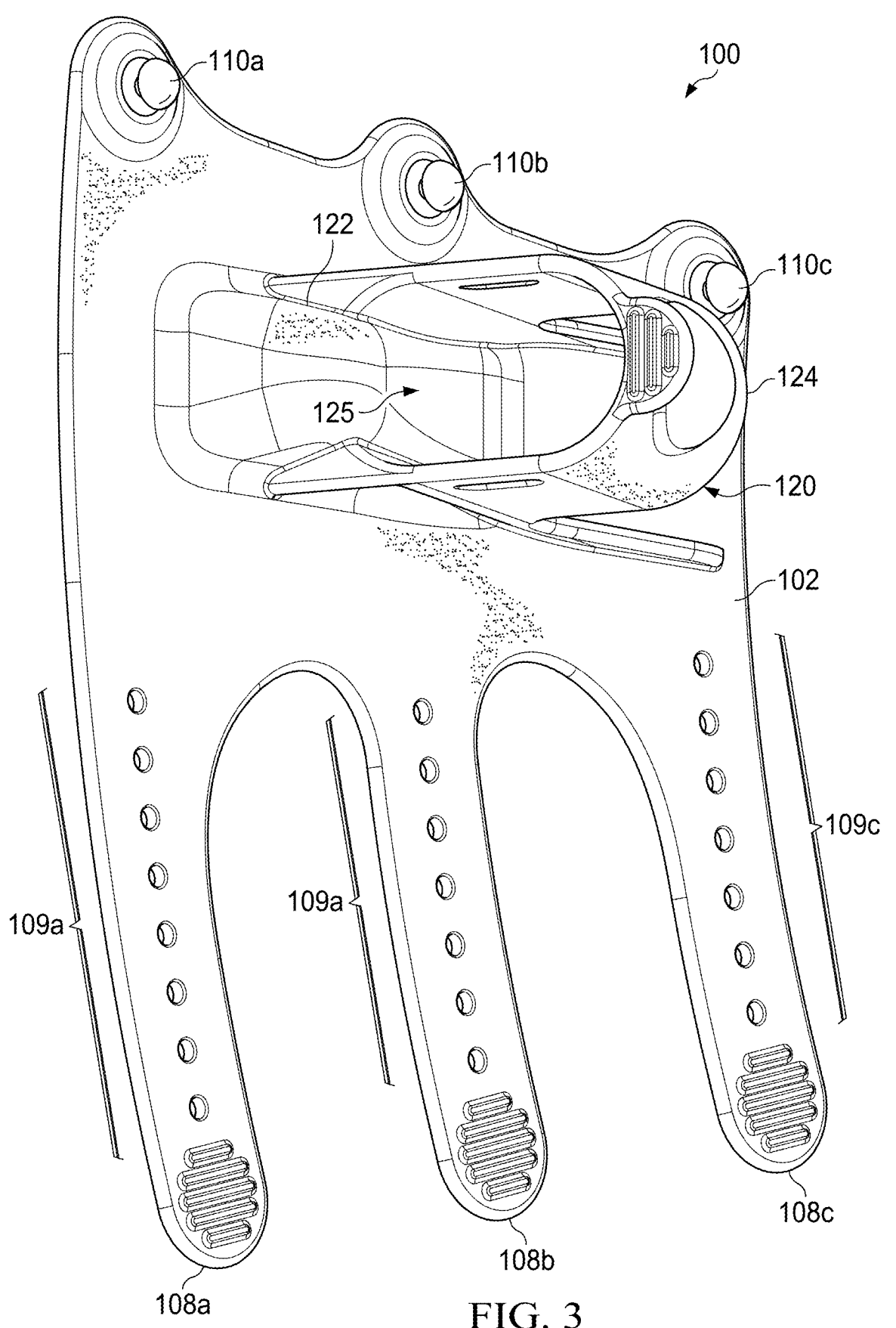
FIG. 3 is a diagrammatic representation of a second view of a holder according to one embodiment.
Figure 4:
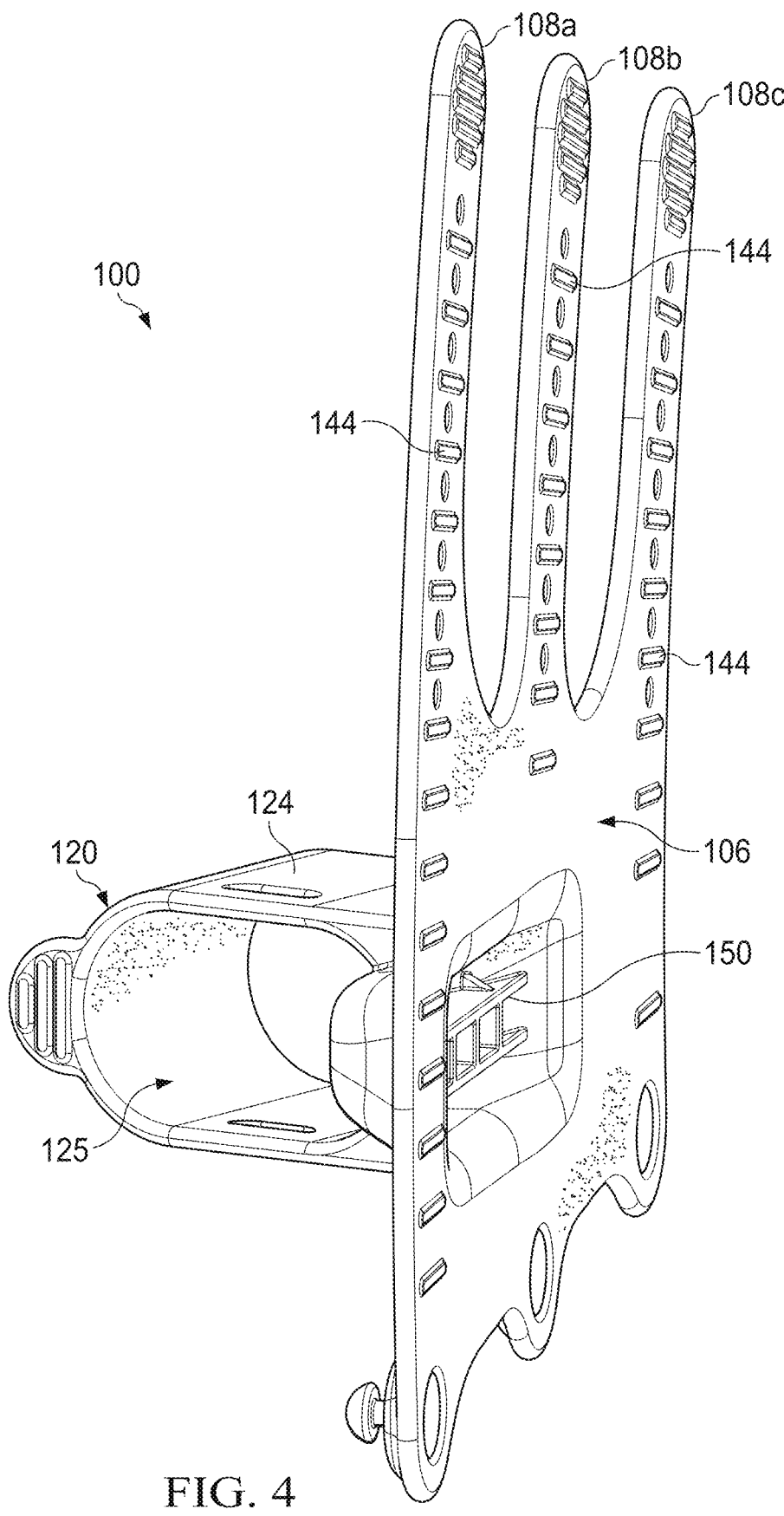
FIG. 4 is a diagrammatic representation of a third view of one embodiment of a holder.
Figure 5:
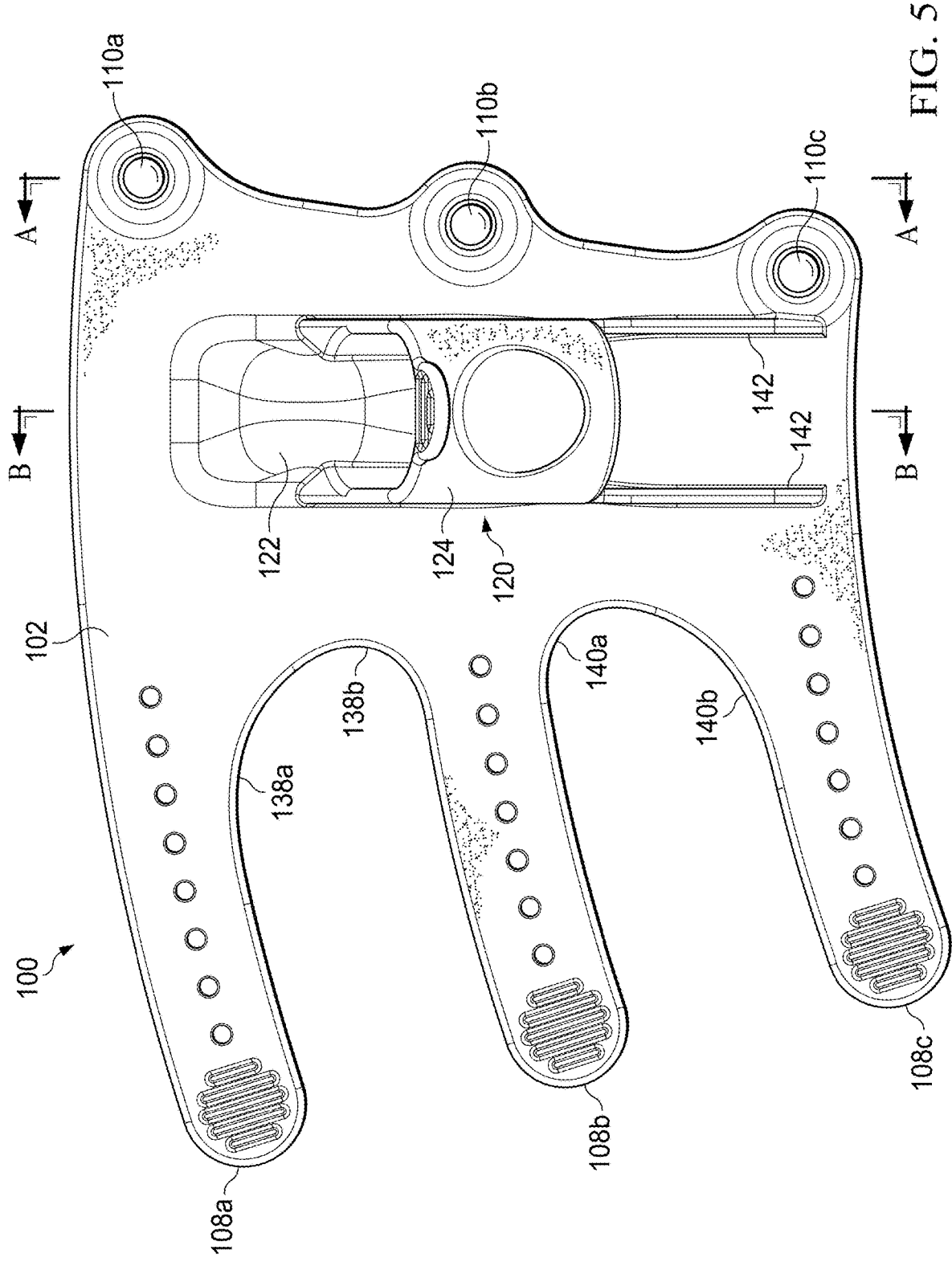
FIG. 5 is a diagrammatic representation of fourth view of a holder according to one embodiment.
Figure 6:
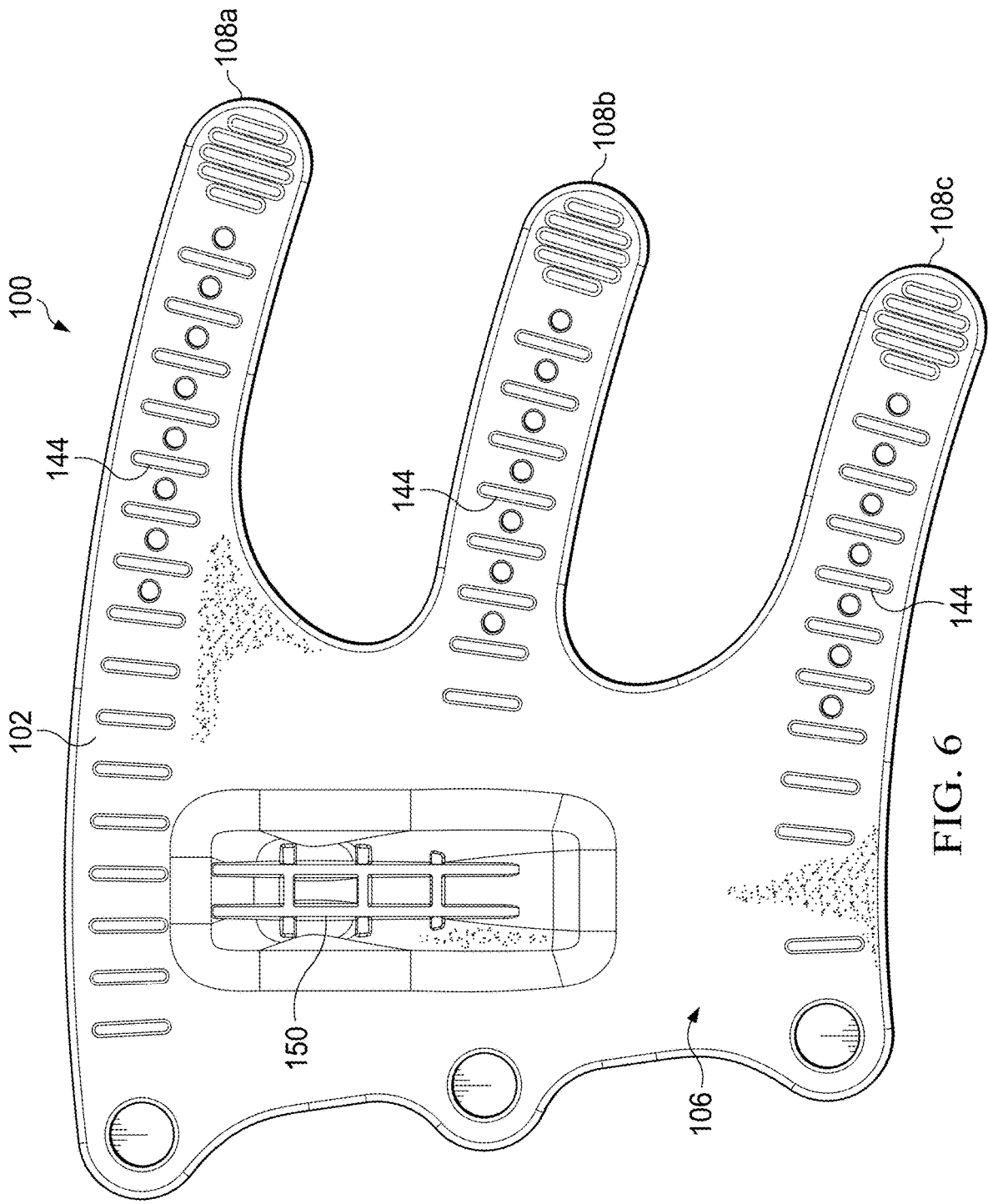
FIG. 6 is a diagrammatic representation of a fifth view a holder according to one embodiment.
Figure 7:
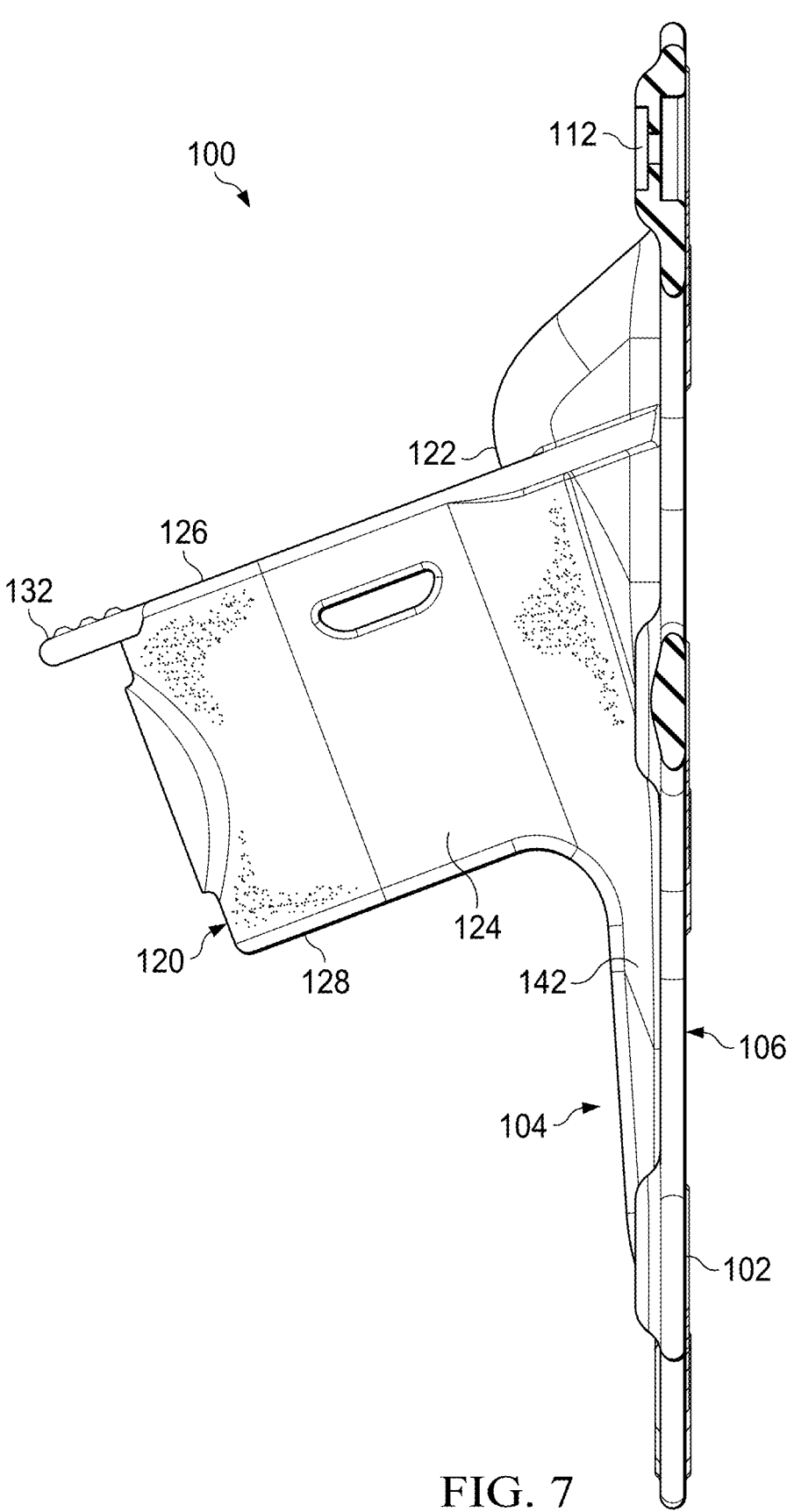
FIG. 7 is a diagrammatic representation of a sectional view of a holder (sectional view A-A of FIG. 5)
Figure 8:
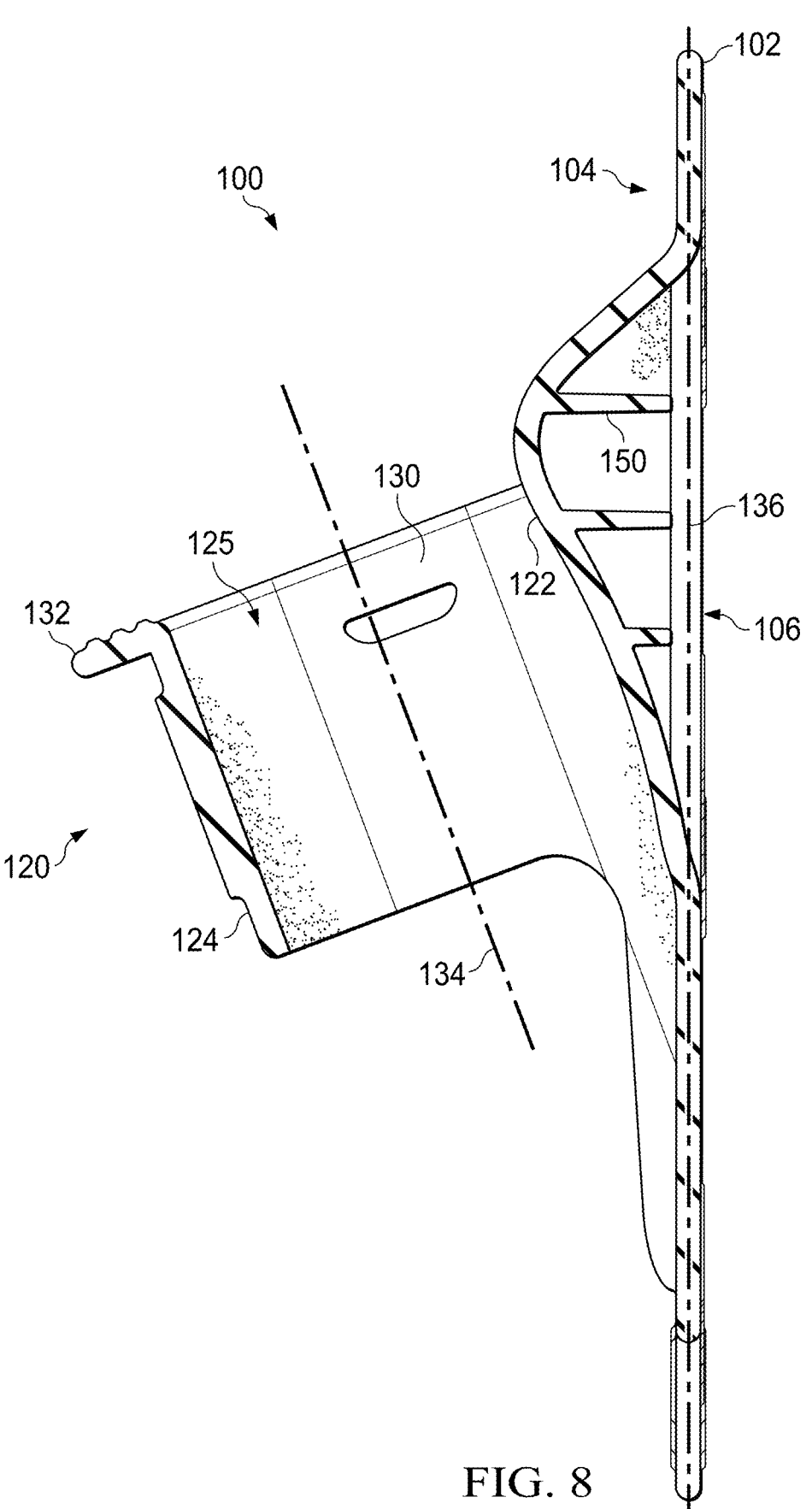
FIG. 8 is a diagrammatic representation of a second sectional view of a holder according to one embodiment (sectional view B-B of FIG. 5).

FIG. 2 is a diagrammatic representation of a first view of another embodiment of a holder 100 for holding a virtual reality controller on an implement, FIG. 3 is a diagrammatic representation of a second view of holder 100 according to one embodiment, FIG. 4 is a diagrammatic representation of a third view of one embodiment of holder 100 according to one embodiment, FIG. 5 is a diagrammatic representation of fourth view of holder 100 according to one embodiment, FIG. 6 is a diagrammatic representation of a fifth view of holder 100 according to one embodiment; FIG. 7 is a diagrammatic representation of a sectional view of a holder (sectional view A-A of FIG. 5 with protrusions 110 omitted), and FIG. 8 is a diagrammatic representation of a second sectional view of holder 100 according to one embodiment (sectional view B-B of FIG. 5).

Holder 100 comprises a holder base 102 having an outer side 104 (side that is away from the implement when in use) and an inner side 106 (side that faces the implement during use) opposite outer side 104. Base 102 can be releasably secured to the outer surface of the underlying. implement. To this end, holder 100 includes an attachment mechanism that allows a user to attach base 102 to an underlying implement. In the illustrated embodiment, for example, holder 100 includes a plurality of resilient and flexible fingers or securing straps (e.g., strap 108a, strap 108c, referred to generally as straps 108) extending out from a first lateral side of base 102. Holder 100 further comprises a sleeve 120 or other controller receiver coupled to the outer side 104 of base for holding a VR controller (e.g., VR controller of FIG. 1). According to one embodiment, base 102, straps 108, and sleeve 120 are formed of or comprise a resilient, elastomeric material. In an even more particular embodiment, base 102, straps 108, and sleeve 120 are formed of or comprise a polymeric material, such as a silicone rubber or a nitrile rubber. In one embodiment, base 102, straps 108, and sleeve 120 are molded or otherwise formed as a single piece. In an even more particular embodiment, base 102, securing straps 108, and sleeve 120 are formed of silicone having a durometer of 60A.

The attachment mechanism can be adjustable to allow the user to attach holder 100 to a variety of implements such as, but not limited to, baseball bats, cricket bats, golf clubs, hockey sticks or kayak paddles. For example, strap 108 includes a series of spaced apertures through the respective band (apertures 109*a*, apertures 109*b*, apertures 109*c* are illustrated, referred to generally as apertures 109), thus allowing straps 108 to be wrapped around the outer contour of the implement—for example, wrap around the circumference of a baseball bat—and releasably engaged to a respective protrusion on the second lateral side of base 102 (protrusion 110*a*, protrusion 110*b*, protrusion 110*c* are illustrated, referred to generally as protrusions 110). Securing the straps in a sufficiently stretched state can cause base 102 to conform to or otherwise press against the outer contour of the underlying implement with the implement facing surface of holder 100 frictionally gripping or otherwise engaging the outer surface of the implement. As such, holder 100 can tightly, but releasably, grip the implement so that holder 100 does not move when a user swings the underlying implement.

According to one embodiment, protrusions 110 are nubs formed of or comprising a relatively hard material, such as a hard plastic, stainless steel, or aluminum. The protrusions are disposed in and extend from pockets in the outer surface of base 102 (pocket 112 is illustrated in FIG. 1). The shape of pockets 112 helps retain the protrusions 110. In addition, the protrusions 110 may be further secured in pockets 112 using an adhesive. Due to the resilience of the straps 108, apertures 109 can expand to allow the head of a protrusion to pass through the respective strap and then contract around the shaft of the protrusion, thereby releasably engaging protrusions 110.

Holder 100 is equipped with a sleeve 120 or other structure disposed on the outer side of base 102 for holding a VR controller (such as VR controller 12). Sleeve 120 defines an interior space that provides a controller receiving area 125 having a first end 126 and a second end 128 (first end 126 and second end 128 are denoted in FIG. 7). While controller receiving area 125 is illustrated as open on both ends, the controller receiving area 125 may be closed on one end. Controller receiving area 125 is defined by a sleeve base wall 122, which may be a portion of base 102, and a sleeve outer portion 124. Sleeve outer portion 124, in the illustrated embodiment, is provided by an arcuate band of material having both ends attached to base 102. Sleeve outer portion 124 may include cutouts or openings or be composed of multiple spaced bands of material or be otherwise formed. In some embodiments, the holder may include releasable straps or other holding mechanism to hold the grip of the VR controller.

Controller receiving area 125 is sized and shaped to receive and grip the grip of a VR controller. In some embodiments, sleeve outer portion 124 is formed of or comprises a resilient material that allows sleeve 120 to stretch over the grip of the VR controller. By way of example, but not limitation, sleeve outer portion 124 may be formed of or comprises a silicone material or a nitrile rubber material. Moreover, the outer profile of controller receiving area 125 when sleeve 120 is empty is, in some embodiments, smaller than the outer profile of the handle of the VR controller with which holder 100 is intended to be used—for example, is smaller than the outer profile of grip 16 of FIG. 1. When the controller grip is inserted into the controller receiving area 125 through first end 126, sleeve 120 can stretch or expand around the controller handle, causing the interior surface 130 (FIG. 8) to frictionally engage the outer surface of the controller grip. The interior surface 130 of sleeve 120 can be surface finished to a rough finish that enhances the frictional engagement. As one example, the interior surface 130 may be polished to an SPI-D1 surface finish in some embodiments. A tab 132 of material protruding from sleeve outer portion 124 proximate to first end 126 provides a finger grip to aid the user in pulling sleeve 120 over the controller's grip. As such, sleeve 120 can tightly grip the handle of the VR controller.

In addition to or in the alternative to using friction to hold a VR controller in sleeve 120, holder 100 may further comprise retaining features to secure the controller to holder 100. In one embodiment, sleeve 120 includes retaining strap openings 129 so that retaining straps can be looped through the retaining strap openings 129 and around a portion of the controller, such as the tracking ring to prevent or limit longitudinal movement of the controller. Preferably the straps or other retaining mechanism are positioned so as not to block the tracking sensors/emitters of the VR controller. Alternatively, or in addition, the retaining straps or other retaining mechanisms may be formed of or comprise an IR transparent material (a material that is sufficiently IR transparent to allow tracking) or otherwise formed of a material that does that interfere with IR tracking or other tracking method used by the VR system. According to one embodiment, the retaining straps are formed of a polymer or natural fabric webbing and are secured using hook and loop material.

Sleeve 120 is configured so the longitudinal axis 134 (FIG. 7) of controller receiving area 125 of sleeve 120 is angled relative to the longitudinal axis 136 (FIG. 7) of base 102 or the outer surface of the implement. More particularly, sleeve 120 is angled to place the tracking sensors/emitters on a tracking ring or other portion of the controller away from base 102. As discussed in conjunction with FIG. 1, this can help reduce any negative impacts the material of holder 100 or the implement may have on tracking. Moreover, in some embodiments, holder 100 can be adapted to hold the controller so that the controller's tracking sensors/emitters lead the implement during a swing.

As discussed above, base 102 may be formed of a flexible and resilient material. Such materials may tend to bunch up longitudinally during a swing. Accordingly, some embodiments of the present disclosure include features to reduce or prevent bunching of a resilient, flexible material. For example, according to one embodiment, the attachment mechanism includes at least one intermediate securing strap (e.g., securing strap 108*b*) between securing strap 108*a* extending laterally at a first end of base 102 and a securing strap 108*b* extending laterally at a second end of base 102 to provide additional gripping area. Furthermore, because hard corners (e.g., acute corners, 90-degree corners or other hard corners) can lead to bunching, the transitions between the securing straps 108, according to one embodiment, are curved to avoid hard corners. In an even more particular embodiment, the transitions comprise multiple radii curves. For example, the continuously curved transition from securing strap 108*a* to securing strap 108*b* comprises a first curve 138*a* having a first radius and a second curve 138*b* having a second radius that is smaller than the first radius. Similarly, the continuously curved transition from securing strap 108*b* to securing strap 180*c* comprises a first curve 140*a* and a second curve 140*b*, where first curve 140*b* has a smaller radius than second curve 140*b*. Further, the larger radii curves allow for additional material between the straps for gripping the implement. Base 102 also comprises longitudinal ribs 142 that extend outward from base 102 and back from the second end 128 of sleeve 120. Longitudinal ribs 142 provide additional stiffness in the longitudinal direction, while allowing base 102 wrap around the outer contour of the implement. Preferably, longitudinal ribs 142 extend longitudinally at least half the distance from second end 128 of sleeve 120 to the edge of base 102, and even more preferably at least two thirds of the distance.

Turning to FIG. 5, the inner side of holder 100 can include various features, such as ribs 144 (only several ribs 144 are denoted) that provide additional longitudinal stiffness. In addition, ribs 144 can provide edges to resist rotation of base 102 on the implement. The inner side surfaces of holder 100 that grip the implement may be surface finished to a rough finish that enhances the frictional engagement. As one example, the inner side surfaces of base 102 and straps 108 may be polished to an SPI-D1 surface finish in some embodiments.

The sleeve base wall 122 of sleeve 120 (FIG. 4) may be formed by a bump out in base 102. As illustrated in FIG. 5, the inner side of the bump out structure that forms sleeve base wall 122 comprises a rib structure 150 of longitudinal and lateral ribs to provide longitudinal and lateral stiffness to sleeve base wall 122 and to support sleeve base wall 122 away from the implement.

In operation, the user places a virtual reality controller's grip in sleeve 120 as far as possible or as needed to ensure a snug fit. In some cases, the user can place the controller in sleeve 120 such that sleeve 120 holds down one or more buttons, triggers or other inputs on the controller's grip. The user then loops the retaining straps around the tracking ring of the controller, pulls them snug and tightly secures the retaining straps. The user places holder 100 on the implement. For example, the user may place holder 100 on a baseball or softball bat at a desired position, such as directly below the barrel of the bat. The user wraps the securing straps 108 around the implement tightly and secures them to the respective protrusions. Preferably, there is tension in the securing straps when they are secured to the protrusions 110.

Figure 9:
FIG. 9 is a diagrammatic representation illustrating one embodiment of a virtual reality controller attached to a user's bat using a holder.

FIG. 9 illustrates one embodiment of using holder 100 with a VR system. In the particular embodiment depicted, the VR system is a Meta Quest 2 VR system comprising a VR controller 202 and a stereoscopic headset 204 (Meta Quest is a trademark of Meta Platforms, Inc.) (all trademarks used herein are the property of their respective owners).

Holder 100 is being used to securely attach VR controller 202 to a baseball bat 206. In the illustrated embodiment, controller 202 has a safety lanyard 203 attached to the controller's grip. In such a case, the user may loop one of the tracking ring retaining straps through lanyard 203 to hold the lanyard out of the way. Holder 100 may be positioned at a known position along the bat. In one embodiment, for example, holder 100 is positioned at the taper between the barrel and the handle of bat 206.

VR headset 204 displays a virtual environment for the user and includes cameras to track tracking emitters, such as IR LEDs, disposed in the tracking ring of controller 202. The VR system can be configured with the size (e.g., length or other size parameters of the bat) and the position of holder 100 or VR controller 202 along the bat). Using the known geometries of the bat, controller 202, holder 100 and position of holder 100, the VR controller can determine the position of the tracking emitters relative to bat 206 and virtualize bat 206 in the virtual environment.

In some cases, such as when the player has bat 206 at the top the hitting position with most of the bat behind the players shoulders, headset 204 may not be able to see the tracking emitters of controller 202. However, the VR system may know the orientation of bat 206 based on data from orientation sensors in controller 202. The VR system can infer the position of the bat. As the emitters of controller 202 come into view, the VR system can determine the position and movement of the bat to portray the bat more accurately in the virtual environment.

Figure 10:
FIG. 10 is a diagrammatic representation of a virtual environment.

FIG. 10 illustrates one embodiment of a virtual environment 300 with a pitcher 301 pitching a ball to the player. The virtual environment 300 in FIG. 10 simulates a baseball field. The virtual environment may display helpful information for training the user such as, for example, the strike zone 304. The VR system displays, on the display, a virtual moving object which requires the user to respond by using the implement. For example, the VR system may display a virtual pitcher pitching a virtual ball that moves along trajectory 308. Further, the VR system tracks the trajectory of the implement using the controller attached to the implement. For example, headset 204 tracks the trajectory baseball bat 206 using controller 202 and provides movement information to controller 202. The VR system maps the movement of the physical bat to virtual environment 300 to determine if a virtual bat 306 hits the virtual ball and, if so, displays the trajectory 310 of the virtual ball off of the virtual bat. One embodiment of determining if a virtual bat hits a virtual ball is described in U.S. Pat. No. 10,821,347, entitled virtual reality sports training systems and methods, which is hereby fully incorporated herein by reference.

In use then, holder 100 is attached to a bat 206 as shown in FIG. 9. Controller 202 is placed in sleeve 120 of the holder 100 either before or after the holder 100 is attached to the bat 206. A user equipped with a virtual reality headset 204 is then presented (by way of a display incorporated into the headset) with a video of a pitcher 301 (see FIG. 10) completing a pitch to the user. The user responds to the pitch by completing a swing. Controller 202 or other part of the virtual reality system then applies motion analytics to the swing and provides feedback to the user. Such feedback may include, for example, a depiction of the trajectory 310 the ball would have taken (see FIG. 10) if struck by the bat in a real-life situation.

Figure 11:
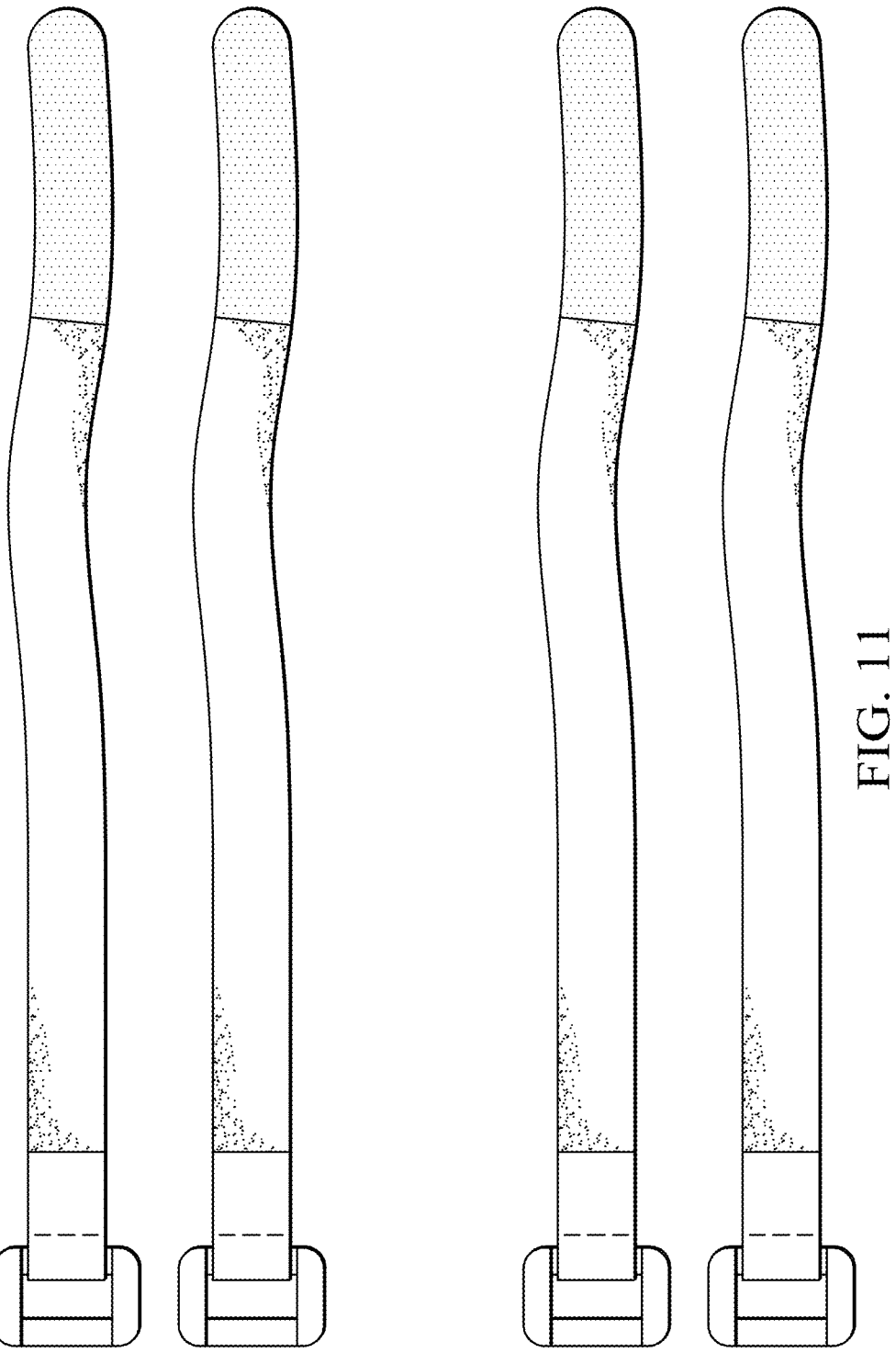
FIG. 11 depicts one embodiment of a set of retaining straps to retain a virtual reality controller in a holder.

In some embodiments, the controller 202 may be secured in the holder 100 with one or more releasable fasteners. Such releasable fasteners may comprise, for example, hook-and-loop type fasteners. FIG. 11 illustrates one embodiment of a set of retaining straps that may be used to hold a VR controller in the sleeve of a holder. The retaining straps are formed of a webbing. The buckles can be used so that each strap may be formed into loops and the straps can include hook and loop material for securing the straps. The straps may be wrapped around controller 202 to secure it in holder 100.

Figure 12:
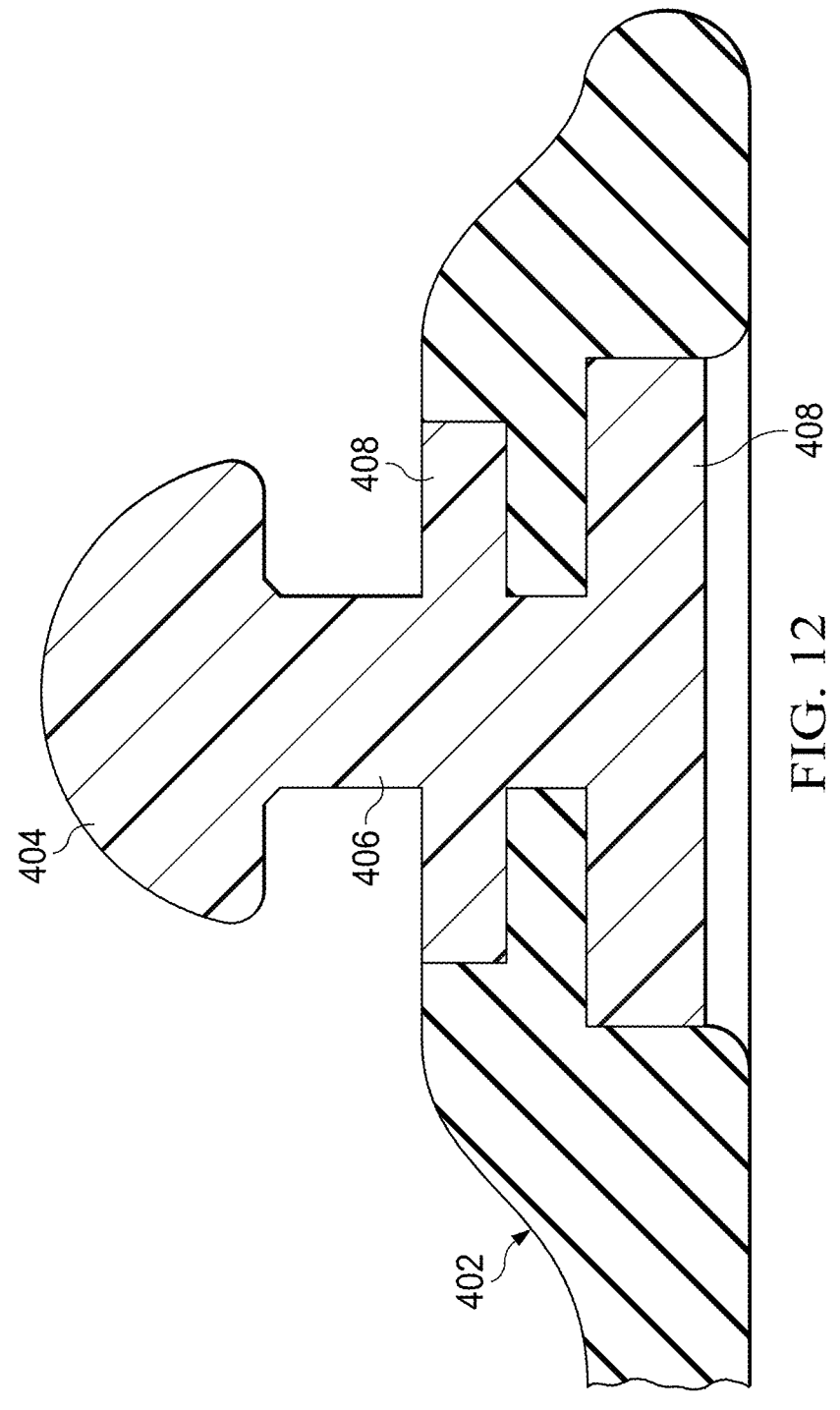
FIG. 12 is a diagrammatic representation of one embodiment of a protrusion for fastening the securing straps in place.

The protrusions used to fasten strap 108 around an implement can have a variety of sizes and shapes. The profile and construction of one embodiment of protrusions (e.g., protrusions 110) are illustrated in FIG. 12. In the embodiment of FIG. 12, the protrusion is equipped with a base 402, a rounded head 404, and a shaft 406 which connects rounded head 404 to base 402. Base 402 of the protrusion includes a plurality of annular extensions 408 which seat the protrusion in the base of the holder.

As will be appreciated, VR device controllers may have a variety of form factors. While the controllers for the Meta Quest 2 VR headset have been used as an example herein, holders can be adapted for other types of controllers.

One embodiment of the present disclosure includes a method for training a user in a sport involving a hand-held implement. The method may include providing the user with a virtual reality headset equipped with a display, releasably attaching a holder to the hand-held implement, disposing a controller for the headset in the holder, displaying, on the display, a moving object which requires the user to respond by moving the implement along a trajectory, acquiring movement data by tracking the movement of the implement along the trajectory, and using the movement data to train the user in the use of the implement.

According to one embodiment, the handheld implement is a baseball bat or a softball bat. Accordingly, displaying on the display the moving object includes displaying video of a baseball or softball pitcher in a pitching method. Displaying on the display the moving object may include displaying a pitch.

The method further comprises, in some embodiments, securing the controller in the holder with a releasable fastener. The releasable fastener, according to one embodiment, is a hook-and-loop type fastener.

One embodiment comprises a training set. The training set comprises a virtual reality headset and a controller for said headset. The training set further includes a holder which releasably fastens said controller to a handheld implement. According to one embodiment, said holder comprises a sleeve or pocket adapted to receive said controller. The holder comprises, in some embodiments, a resilient base; a plurality of protrusions; and a plurality of straps which releasably engage said protrusions. The plurality of straps are to wrap around said handheld implement. In some embodiments, the holder further comprises a releasable fastener which secures the controller in the holder. The releasable fastener is a hook-and-loop type fastener in some embodiments. The training set may be provided in combination with the handheld implement.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined.

Although the invention has been described with respect to specific embodiments thereof, these embodiments are merely illustrative, and not restrictive of the invention as a whole. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

In accordance with the provisions of the patent statutes, the present disclosure has been described to represent what is considered to represent the preferred embodiments. However, it should be noted that this disclosure can be practiced in other ways than those specifically illustrated and described without departing from the spirit or scope of this disclosure.

What is claimed:

1. A virtual reality controller holder comprising:
a resilient base that releasably fastens to a handheld implement, the resilient base having an inner side that faces the handheld implement during use and an outer side opposite the inner side;
a resilient sleeve disposed on the outer side of the resilient base, the resilient sleeve adapted to receive and stretch around a handle of a virtual reality controller, wherein the resilient sleeve defines a controller receiving area for receiving the handle of the virtual reality controller, wherein the controller receiving area extends from a first end to a second end and is open at the first end to allow the handle of the virtual reality controller to be inserted into the controller receiving area through the first end, wherein the resilient sleeve is adapted to support the handle of the virtual reality controller in an angled position angled away from the handheld implement moving along the controller receiving area toward the first end of the controller receiving area; and
a retaining strap to secure the virtual reality controller to the virtual reality controller holder.

2. The virtual reality controller holder of claim 1, wherein the retaining strap is coupled to the resilient sleeve and is adapted to loop around a tracking ring of the virtual reality controller to retain the virtual reality controller.

3. The virtual reality controller holder of claim 1, wherein the resilient base has a first longitudinal axis and the resilient sleeve has a second longitudinal axis, and wherein the first longitudinal axis is angled from the first longitudinal axis.

4. The virtual reality controller holder of claim 3, wherein the second end of the controller receiving area is open to allow the handle of the virtual reality controller to extend out of the second end of the controller receiving area.

5. The virtual reality controller holder of claim 4, wherein the controller receiving area is tilted relative to the resilient base.

6. The virtual reality controller holder of claim 4, wherein the resilient sleeve comprises a sleeve base wall and an arcuate sleeve outer portion.

7. The virtual reality controller holder of claim 6, wherein the resilient base comprises longitudinal stiffening ribs.

8. The virtual reality controller holder of claim 6, wherein the sleeve base wall forms an incline, wherein the incline is adapted to angle away from the handheld implement moving toward the first end of the controller receiving area.

9. The virtual reality controller holder of claim 8, further comprising a plurality of flexible, resilient securing straps extending laterally from the resilient base, the plurality of flexible, resilient securing straps adapted to wrap around the handheld implement.

10. The virtual reality controller holder of claim 9, further comprising a plurality of protrusions extending from the resilient base, wherein each of the plurality of flexible, resilient securing straps is adapted to releasably couple to a respective protrusion from the plurality of protrusions.

11. The virtual reality controller holder of claim 9, wherein the plurality of flexible, resilient securing straps comprises:
a first securing strap;
a second securing strap; and
a third securing strap, wherein the virtual reality controller holder further comprises a first transition between the first securing strap and the second securing strap and a second transition between the second securing strap and the third securing strap, wherein the first transition comprises a first plurality of curves having multiple radii, and wherein the second transition comprises a second plurality of curves having multiple radii.

12. The virtual reality controller holder of claim 1, further comprising:
a plurality of ribs on the inner side of the virtual reality controller holder, the plurality of ribs adapted to contact an outer surface of the handheld implement to inhibit rotation of the virtual reality controller holder.

13. The virtual reality controller holder of claim 1, wherein the virtual reality controller holder is adapted to attach to a baseball bat or a softball bat.

14. A method sports training, the method comprising:
attaching a virtual reality controller holder to a handheld implement, the virtual reality controller holder comprising:
a resilient base that is releasably fastens to the handheld implement, the resilient base having an inner side that faces the handheld implement during use and an outer side opposite the inner side;
a resilient sleeve disposed on the outer side of the resilient base, the resilient sleeve adapted to receive and stretch around a grip of a virtual reality controller of a virtual reality system, wherein the resilient sleeve defines a controller receiving area for receiving the grip of the virtual reality controller, wherein the controller receiving area extends from a first end to a second end and is open at the first end to allow the grip of the virtual reality controller to be inserted into the controller receiving area through the first end, wherein the resilient sleeve is adapted to support the grip of the virtual reality controller in an angled position angled away from the handheld implement moving along the controller receiving area toward the first end of the controller receiving area; and
a retaining strap to secure the virtual reality controller to the virtual reality controller holder;
inserting the grip of the virtual reality controller into the resilient sleeve through the first end of the controller receiving area with a tracking ring of the virtual reality controller away from the handheld implement;
securing the virtual reality controller to the virtual reality controller holder, wherein securing the virtual reality controller to the virtual reality controller comprises looping the retaining strap around the tracking ring of the virtual reality controller and securing the retain strap;

displaying on a display of the virtual reality system a virtual moving object;

acquiring movement data by tracking movement of the handheld implement along a trajectory; and using the movement data to train a user in the user of the handheld implement.

15. The method of claim 14, wherein the handheld implement is a baseball bat or a softball bat.

16. The method of claim 15, wherein attaching the virtual reality controller holder to the handheld implement comprises attaching the virtual reality controller holder on a taper between a barrel and a handle of the baseball bat or the softball bat.

17. The method of claim 14, wherein the virtual reality controller holder comprises a plurality of flexible, resilient securing straps and wherein attaching the virtual reality controller holder to the handheld implement comprises releasably securing the plurality of flexible, resilient securing straps around the handheld implement.

18. The method of claim 17, wherein the virtual reality controller holder comprises a plurality of protrusions and wherein releasably securing the plurality of flexible, resilient securing straps around the handheld implement comprises securing each of the flexible, resilient securing straps to a respective protrusion from the plurality of protrusions.

19. The method of claim 14, wherein the virtual moving object is a virtual baseball.

20. The method of claim 19, further comprising displaying a pitcher pitching the virtual baseball on the display of the virtual reality system.

\* \* \* \* \*